United States Patent

Shimizu et al.

[11] Patent Number: 5,114,800
[45] Date of Patent: May 19, 1992

[54] SOFT MAGNETIC THIN FILM

[75] Inventors: Osamu Shimizu; Kanji Nakanishi, both of Kanagawa, Japan

[73] Assignee: Fuji Photo Film Co., Ltd., Kanagawa, Japan

[21] Appl. No.: 549,996

[22] Filed: Jul. 9, 1990

[30] Foreign Application Priority Data

Jul. 10, 1989 [JP] Japan .................................. 1-178924

[51] Int. Cl.⁵ .............................................. B32B 9/00
[52] U.S. Cl. .................................. 428/692; 428/900; 428/611; 428/659; 428/681; 360/113; 360/125; 360/126
[58] Field of Search ............... 428/694, 900, 611, 659, 428/681; 360/113, 125, 126; 148/310, 311; 204/192.1; 427/127

[56] References Cited

U.S. PATENT DOCUMENTS

| | | | |
|---|---|---|---|
| Re. 33,022 | 8/1989 | Takayama et al. | 148/311 |
| 3,783,041 | 1/1974 | Tokushima | 148/310 |
| 4,033,791 | 7/1977 | Kaczkowski | 148/311 |
| 4,126,287 | 11/1978 | Mendelsohn et al. | 148/311 |
| 4,188,211 | 2/1980 | Yamaguchi et al. | 148/304 |
| 4,190,438 | 2/1980 | Aso et al. | 148/304 |
| 4,226,619 | 10/1980 | Hatta et al. | 148/311 |
| 4,264,356 | 4/1981 | Shinagawa et al. | 148/310 |
| 4,540,453 | 9/1985 | Boredelon et al. | 148/310 |
| 4,618,542 | 10/1986 | Morita et al. | 360/113 |
| 4,663,607 | 5/1987 | Kitada et al. | 360/113 |
| 4,891,278 | 1/1990 | Otomo et al. | 428/692 |
| 5,057,380 | 10/1991 | Hayashi et al. | 428/900 |

*Primary Examiner*—Merrell C. Cashion, Jr.
*Assistant Examiner*—Robert J. Follett
*Attorney, Agent, or Firm*—Sughrue, Mion, Zinn, Macpeak & Seas

[57] ABSTRACT

Uniaxially oriented soft magnetic thin film consists essentially of 1 to 15 atomic percent of Co and/or Ni, and the balance being Fe, and has a crystal structure of a body-centered cubic system, wherein the film is oriented substantially in the [111] direction and the absolute value of the saturation magnetostriction $\lambda_f$ of the film is not more than $5\times 10^{-6}$. The film has low coercivity 1 Oe or less and high magnetic permeability maintaining high saturation magnetic flux density of 18 kG or more. $\lambda_f$ reaches zero and is adjustable. Addition of 0.2 to 20 atomic percent of Ru, Mn, Cr and/or V increases wear resistance. The film is formed by deposition on {111} plane of GaAs substrate, or on c-plane of hexagonal $B_8$ stracture.

25 Claims, 1 Drawing Sheet

SOFT MAGNETIC THIN FILM

TECHNICAL FIELD OF THE INVENTION

This invention relates to a soft magnetic thin film and, more particularly, to a soft magnetic thin film which may be advantageously employed in, for example, a core material of a magnetic head and, above all, as the main magnetic pole material for a magnetic head for perpendicular recording.

BACKGROUND OF THE INVENTION

In a magnetic recording and/or reproducing apparatus, such as an audio tape recorder or video tape recorder (VTR), the recent tendency is towards a higher quality and a higher recording density of recording signals. In keeping up with such tendency towards the higher recording density, a so-called metal tape in which powders of metals such as Fe, Co or Ni, or alloys thereof, are used as the magnetic powders, or a so-called evaporation-deposited tape in which a magnetic metal material is directly deposited on a base film by a vacuum thin film forming technique, has been developed as the magnetic recording medium and employed in many fields of application.

For demonstrating the properties of the magnetic recording medium having such prescribed coercive force, there are requirements for a small coercive force, a high saturation magnetic flux density and a high magnetic permeability as the properties of the core material of the magnetic head. With a magnetic head for perpendicular recording expected to be used in the near future, it becomes necessary to use a material having a still higher saturation magnetic flux density as the main magnetic pole material. However, the ferrite material frequently used as the core material for the magnetic head has only a low magnetic flux density, whereas the Permalloy is unsatisfactory in wear resistance.

PROBLEMS TO BE SOLVED

Up to now, a Sendust alloy (Fe-Al-Si alloy) has been thought as being suitable as the core material satisfying these various requirements. The Sendust alloy has desirable soft magnetic properties such as a high magnetic permeability and a low coercive force. For maintaining these superior soft magnetic properties, it is desirable that both the saturation magnetostriction $\lambda_f$ and the crystal magnetic aniosotropy $K_1$ be as close to zero as possible. The composition as the soft magnetic material that may be employed as the magnetic head is determined in view of the values of these two properties. Once the composition of the material is determined, the saturation magnetic flux density is determined in dependence upon this composition. In the case of the Sendust alloy, the saturation magnetic flux density has a limit value of 10 to 11 k Gauss, which is not necessarily satisfactory.

For this reason, a Co base amorphous magnetic alloy material, or a so-called amorphous magnetic alloy material, which suffers a low decrease of magnetic permeability in the high frequency area and has a high saturation magnetic flux density, has been developed to take the place of the Sendust alloy. However, this amorphous magnetic alloy material has a saturation magnetic flux density of the order of 14 k Gauss, which may not be said to be satisfactory.

There is also proposed recently a [110] oriented film in which, by taking advantage of the fact that the sputered Fe-based crystalline film tends to be oriented along the [110] direction, the saturation magnetostriction $\lambda_f$ of the film in the [110] direction is reduced to close to zero. Although it is possible with this film to realize the saturation magnetic flux density in the order of 20 k Gauss, this film is not practically satisfactory in the soft magnetic properties, that is, it is not sufficiently low in the coercivity.

SUMMARY OF THE DISCLOSURE

It is therefore an object (referred to as first object) of the present invention to provide a novel soft magnetic thin film having a high saturation magnetic flux density and superior soft magnetic properties which are characterized by a low coercivity and high magnetic permeability.

It is a second object of the present invention to provide a novel soft magnetic thin film not only having the features as mentioned at the first object hereinabove, but having the adjustability of the saturation magnetostriction while maintaining the high saturation magnetic flux density.

It is a third object of the present invention to provide a novel soft magnetic thin film not only having the features required as the first or second object; but further having a high wear resistance suitable for the core of the magnetic head.

Other objects will become apparent in the entire disclosure.

In accordance with the present invention, there is provided a soft magnetic thin film consisting essentially of Fe, and having a crystal structure of a body-centered cubic system (referred to as bcc structure), wherein the film is oriented substantially in the [111] direction and the absolute value of the saturation magnetostriction $\lambda_f$ of the film is not more than $5 \times 10^{-6}$.

If the absolute value of the saturation magnetostriction $\lambda_f$ of the film exceeds about $5 \times 10^{-6}$, the coercive force is increased so that the satisfactory soft magnetism aimed at in accordance with the present invention is not realized.

Preferably, one or both of Co and Ni is contained in the thin film in a total amount of not less than 1 atomic percent and not more than 15 atomic percent. For improving the wear resistance, at least one of the elements selected from the group consisting of Ru, Mn, Cr and V may be contained in the thin film in a total amount of not less than 0.2 atomic percent and not more than 20 atomic percent.

Since the soft magnetic thin film of the present invention is essentially constituted by the thin film oriented in the {111} plane of the cubic system, rotation of the magnetic moment within the plane is not influenced by the crystal magnetic anisotropy $K_1$. Thus the value of $K_1$ need not be reduced to zero even if satisfactory soft magnetism is desired, so that the film composition may be determined only by taking the saturation magnetostriction $\lambda_f$ of the film into account. Meanwhile, with the magnetostriction constants $\lambda_{100}$ and $\lambda_{111}$ in the [100] direction and [111] direction, respectively, of the single crystal, the saturation magnetostriction $\lambda_f$ of the film thus oriented in the [111] direction is generally given by the formula:

$$\lambda_f = \tfrac{1}{3}\lambda_{100} + \tfrac{2}{3}\lambda_{111}.$$

With the soft magnetic thin film consisting essentially of Fe and having the crystal structure of the body-centered cubic system, wherein the film is oriented substantially in the [111] direction and the absolute value of the saturation magnetostriction $\lambda_f$ of the film is not more than $5 \times 10^{-6}$ in accordance with the present invention, a soft magnetic thin film may be provided which has desirable soft magnetic properties of the low coercive force and high magnetic permeability and, in addition, the high saturation magnetic flux density. This thin film has, above all, an outstanding feature of the high saturation magnetic flux density. This desirable feature may be demonstrated when the film is used as a core material for a write/read head of a recording medium for perpendicular recording for which the above feature is required.

In the above mentioned thin film, Co and/or Ni may be contained in an amount of not less than 1 atomic percent and not more than 15 atomic percent without affecting the above feature. By such addition, the saturation magnetostriction of the film may be adjusted while the saturation magnetic flux density is maintained at the desired higher value. The saturation magnetic flux density amounts to at least 18 kG, further reaching 20 kG or more as the preferred embodiments.

Due to the presence of at least one element selected from the group of Ru, Mn, Cr and V in a total amount of not less than 0.2 atomic percent and not more than 20 atomic percent, the thin film is improved in wear resistance, so that, when the film is applied in the core of magnetic head, a thin film magnetic head may be provided which exhibits a superior wear resistance and thus may be employed for an extended period of time.

In the following, the preferred embodiments of the present invention will be set forth with reference to the accompanying Drawings.

DESCRIPTION OF THE PREFERRED EMBODIMENTS

Figure 1:
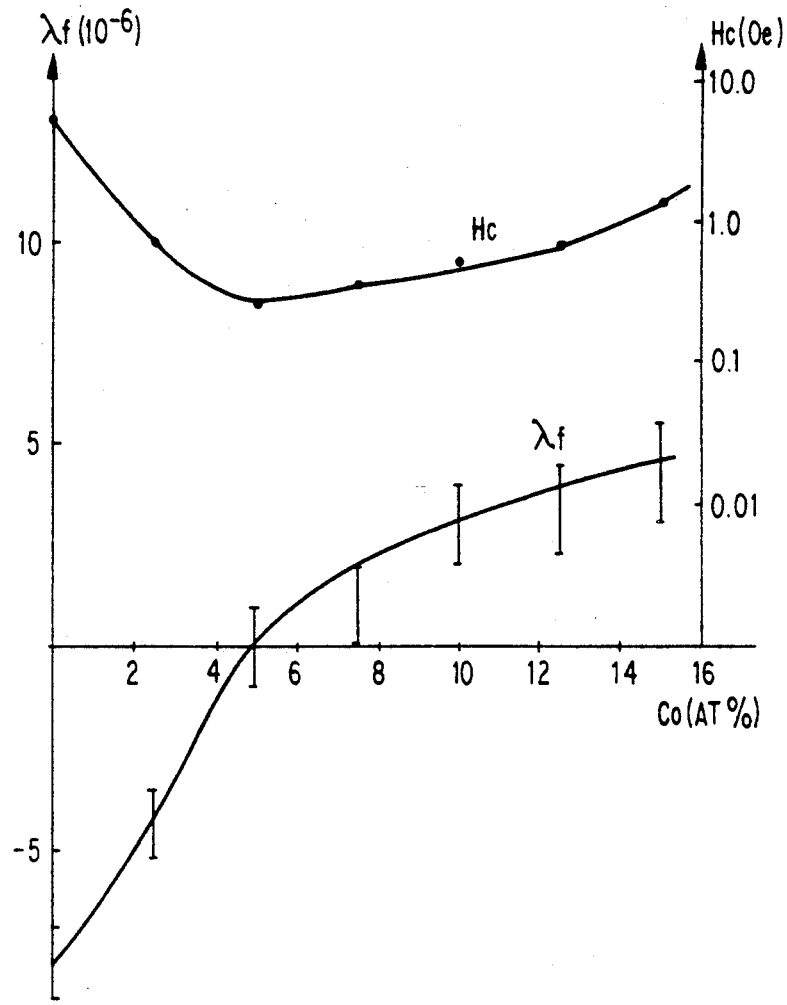
FIG. 1 is a chart showing the Co content dependency of the saturation magnetostriction and Hc of the Fe-Co alloy thin film oriented in the [111] direction, according to an embodiment of the present invention.

The saturation magnetostriction of a pure Fe film oriented in the [111] direction is in the order of $-7 \times 10^{-6}$, which is too large as the value of saturation magnetostriction of the soft magnetic thin film. However, it may approach close to zero by addition of other element(s). For example, the absolute value $|\lambda_f|$ of the saturation magnetostriction of the film may approach close to zero by addition of 1 to 15 atomic percent of Co and/or Ni in total. Meanwhile, besides Co and/or Ni, Si, for example, may also be added in an amount of 10 atomic percent or thereabouts to draw the value of $|\lambda_f|$ close to zero, in which case the film still exhibits superior soft magnetism. The reason that Co and Ni are particularly excellent as the addition elements is that they enable the value of $\lambda_f$ to be adjusted without lowering the saturation magnetic flux density.

When the film is used in an application in which the wear resistance is required, at least one element selected from the group consisting of Ru, Mn, Cr and V may be added. Wear resistance of the film may be improved by addition of at least one of the elements selected from the group of Ru, Mn, Cr and V in an amount in total of not less than 0.2 atomic percent. However, if at least one of the elements selected from the group of Ru, Mn, Cr and V is added in an amount exceeding 20 atomic percent, the saturation magnetic flux density is lowered, which is contrary to the objective of the present invention. From the similar viewpoint, the entire total of these elements (Ru, Mn, Cr and V) and Co and/or Ni is preferably not more than 20 atomic percent of the composition.

With the soft magnetic thin film of the present invention, it is required that the film is formed at an orientation along the {111} plane of the cubic system and that the absolute value of magnetostriction $|\lambda_f|$ of the film is not more than $5 \times 10^{-6}$ ($|\lambda_f| \leq 5 \times 10^{-6}$). Therefore, these requirements need to be satisfied irrespective of the kinds of the additional elements employed. On the other hand, if these requirements are satisfied, such elements as Pt, Rh, Ir or Os may be added for the purpose of improving corrosion resistance, for example, as long as the saturation magnetic flux density is not lowered significantly by addition of these elements.

Although a GaAs substrate is employed in the Examples, any substrate which will allow the thin film to be oriented in the [111] direction may be employed besides the GaAs substrate. Thus a Ge substrate, for example, may be employed for achieving similar results.

In addition, since the c-Plane of such material as NiMnGe having a hexagonal $B_8$ structure frequently has good lattice alignment characteristics with the {111} plane of the Fe based bcc crystal, the material such as NiMnGe is also suitable as the substrate material of the thin film according to the present invention.

The film forming method is naturally not limited to an RF sputtering method, and a molecular beam epitaxial (MBE) method or an ion beam sputtering method, for example, generally referred to as the vapor deposition technique may also be employed.

The substrate temperature during film formation is preferably in the range of 300° to 500° C. and most preferably about 350° C. With too low a substrate temperature, the desired orientation is not achieved, whereas, with a lower substrate temperature, the produced film tends to be oriented in the [110] direction.

EXAMPLES

Several experiments conducted on the thin film pertaining to the present invention are given hereinbelow as Examples 1 and 2.

EXAMPLE 1

Thin films were produced on a GaAs substrate by an RF sputtering method with the use of Ar and a target of a Fe-Co alloy with the Co content of 0 to 16 atomic percent. The Co content of the thin film was changed by changing the target composition. The GaAs substrate was polished to a mirror finish on its {111} plane. As the sputtering conditions, a cathode power of 60 W, a target diameter of 100 mm (4 inches), a gas pressure of 0.6 Pa and a substrate temperature of 350° C. were employed, and a magnetic field of ca. 60 Oe was applied in a direction parallel to the substrate surface for providing uniaxial anisotropy. Under these conditions, sputtering was continued for three hours, and a film of about 0.2 μm in thickness, which is fully satisfactory for practical purposes, could thereby be produced. Prior to the film formation, the GaAs substrate employed was cleaned sufficiently by bombardment of Ar ions. On each of the thin films produced was observed orientation in the [111] direction. FIG. 1 shows the saturation magnetostriction $\lambda_f$ and the coercive force Hc plotted on the ordinate as a function of the Co content in the target in atomic percent plotted on the abscissa. The coercive force Hc was determined by measuring B-H characteristics under application of 50 Hz magnetic field. The saturation magnetostriction $\lambda_f$ of the film was measured in various directions parallel to the film plane. Certain anisotropies were observed within the plane. The coercive force Hc was measured along the hard axis of magnetization. The saturation magnetic flux density is not dependent on the measurement direction. As may be seen in FIG. 1, a satisfactory soft magnetic film with a coercive force Hc$\leq$1 Oe has been obtained for the absolute value of the of the saturation magnetostriction $|\lambda_f| \leq 5 \times 10^{-6}$. Meanwhile, the film thickness was as small as 0.2 $\mu$m and considerable error was necessarily introduced in measurement of the film thickness so that the value of the saturation magnetic flux density could not be determined accurately. However, the saturation magnetic flux density calculated from the measured values, exceeded 18 kG, which is quite satisfactory. It is especially noteworthy that the minimum values of $|\lambda_f|=0$ and Hc=0.3 Oe were obtained for the Co content of ca. 5 atomic percent.

As shown in FIG. 1, a Co range of 2-13 atomic percent is preferred. More preferred is a range of 3-11 atomic percent Co with $|\lambda hd f| \leq 3.5 \times 10^{-6}$, and most preferred is a range of 4-6.5 atomic percent Co with $|\lambda_f| \leq 1.5 \times 10^{-6}$.

EXAMPLE 2

Figure 2:
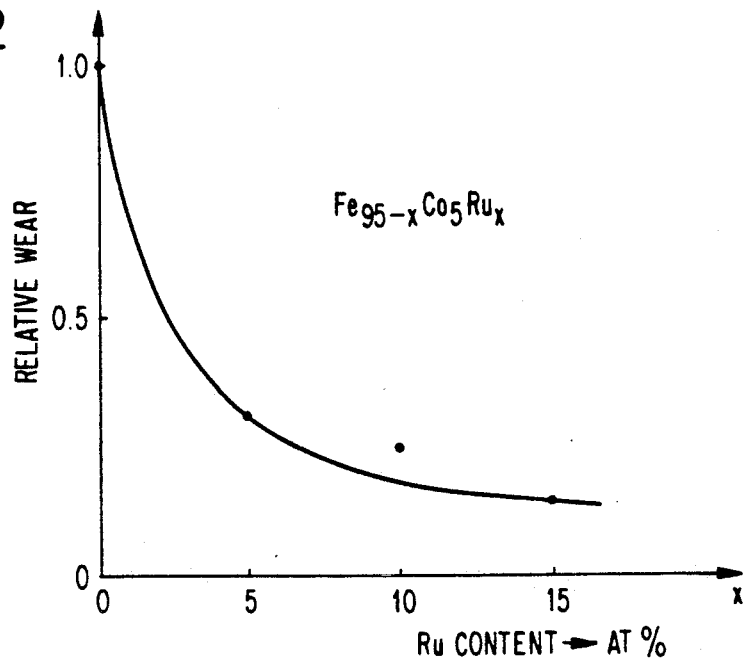
FIG. 2 is a chart showing the relation between the amount of addition of Ru and the wear in the thin film of the present invention.

The RF sputtering was performed in the similar manner to Example 1 with the use of a target having the composition of $Fe_{90}Co_5Ru_5$ in atomic ratio. The thin films thus produced showed satisfactory soft magnetism with the measured values of the saturation magnetic flux density not lower than 18 kG and the coercive force Hc of not higher than 0.5 Oe. For evaluating the wear resistance of the Ru-added alloys, four different alloys $Fe_{95}Co_5$, $Fe_{90}Co_5Ru_5$, $Fe_{85}Co_5Ru_{10}$ and $Fe_{80}Co_5Ru_{15}$, with the constant Co content and different Fe and Ru contents, were prepared, and dummy magnetic heads were produced using the bulk materials of these alloys. These dummy magnetic heads were subjected to a sliding test on a metal floppy disket (FUJIX VF-HR). After the sliding test for 1000 hours at a rotational speed of 3600 rpm at a position r=15 to 20 mm from the center, the volume lost by wear was measured and the relative amounts of wear per the unit wear amount equal to 1 caused to the dummy head of $Fe_{95}Co_5$ were determined for the respective alloy heads. The results are shown in FIG. 2. It may be seen from this figure that the wear resistance of the alloy heads is improved significantly with increase in the amount of Ru. It has been ascertained by a separate test the above mentioned excellent properties as the soft magnetic material may be maintained even with such addition of Ru.

COMPARATIVE EXAMPLE

For comparison with the soft magnetic material pertaining to the present invention, a thin film for control was prepared in the same way as in Example 1 except using a target composed of $Fe_{98}Si_2$ of the conventional soft magnetic material and a substrate of GaAs having the {110} plane, and similar measurements were performed in connection with soft magnetism. It was revealed from these measurements that the control film was oriented in the [110] direction, the saturation magnetic flux density and the saturation magnetostriction $\lambda_f$ of the control film were 18 kG or higher and approximately zero, respectively, and that, however, the coercive force of the control film was as high as 2.5 Oe, thus demonstrating that the control film was inferior in coercive force to the thin film of the present invention. It is noted that, although the composition of the produced films in the above experiments is assumed to be the same as the target composition, errors produced in the measured values due to such assumption are practically null.

It should be noted that modifications in the art may be done without departing from the gist of the present invention within the concept and scope thereof herein disclosed and claimed hereinbelow.

What is claimed is:

1. A soft magnetic thin film consisting essentially of 1 to 15 atomic percent of one or both of Co and Ni, and the balance being Fe, and having a crystal structure of a body-centered cubic system, wherein the film is oriented substantially in the [111] direction and the absolute value of the saturation magnetostriction $\lambda_f$ of the film is not more than $5 \times 10^{-6}$.

2. A soft magnetic thin film as defined in claim 1 wherein at least one of the elements selected from the group consisting of Ru, Mn, Cr and V is contained in a total amount of 0.2 to 20 atomic percent.

3. A soft magnetic thin film as defined in claim 1 wherein the film has a coercivity of not more than 1 Oe.

4. A soft magnetic thin film as defined in claim 2 wherein the film has a coercivity of not more than 1 Oe.

5. A soft magnetic thin film as defined in claim 1 wherein the film has a saturation magnetic flux density of at least 18 kG.

6. A soft magnetic thin film as defined in claim 2 wherein the film has a saturation magnetic flux density of at least 18 kG.

7. A soft magnetic thin film as defined in claim 3 wherein the film has a saturation magnetic flux density of at least 18 kG.

8. A soft magnetic thin film as defined in claim 4 wherein the film has a saturation magnetic flux density of at least 18 kG.

9. A soft magnetic thin film as defined in claim 1 wherein Co is present in an amount of about 5 atomic percent, and the absolute value of the saturation magnetostriction $\lambda_f$ is substantially zero, and which has a coercivity of 0.3 Oe.

10. A soft magnetic thin film as defined in claim 9 wherein at least one of the elements selected from the group consisting of Ru, Mn, Cr and V is contained in a total amount of 0.2 to 20 atomic percent.

11. A soft magnetic thin film as defined in claim 1 wherein at least one of the elements selected from the group consisting of Ru, Mn, Cr and V is present in a total amount of not more than 20 atomic percent.

12. A soft magnetic thin film as defined in claim 2 wherein Ru is present in an amount of not more than 15 atomic percent.

13. A soft magnetic thin film as defined in claim 1 wherein Co is present in an amount of 2-13 atomic %.

14. A soft magnetic thin film as defined in claim 1 wherein Co is present in an amount of 3-11 atomic percent and the absolute value of the saturation magnetostriction $\lambda_f$ of the film is not more than $3.5 \times 10^{-6}$.

15. A soft magnetic thin film as defined in claim 1 wherein Co is present in an amount of 4-6.5 atomic percent and the absolute value of the saturation magnetostriction $\lambda_f$ of the film is not more than $1.5 \times 10^{-6}$.

16. A soft magnetic thin film as defined in claim 15 wherein at least one of the elements selected from the group consisting of Ru, Mn, Cr and V is contained in a total amount of 0.2 to 20 atomic percent.

17. A soft magnetic thin film as defined in claim 1 wherein Ru is present in an amount of 0.2-20 atomic percent.

18. A soft magnetic thin film as defined in claim 2 wherein the total amount of at least one of Co and Ni and at least one of Ru, Mn, Cr and V does not exceed 20 atomic percent.

19. A soft magnetic thin film as defined in claim 1 wherein the film has been formed through deposition on a substrate of a temperature of 300°-500° C.

20. A soft magnetic thin film as defined in claim 2 wherein the film has been formed through deposition on a substrate of a temperature of 300°-500° C.

21. A soft magnetic thin film as defined in claim 1 wherein the film has been formed through deposition on a substrate of a temperature of about 350° C.

22. A soft magnetic thin film as defined in claim 1 wherein the film has been formed on a {111} plane of a GaAs substrate.

23. A soft magnetic thin film as defined in claim 19 wherein the film has been formed on a {111} plane of a GaAs substrate.

24. A soft magnetic thin film as defined in claim 1 wherein the film has been formed on a c-plane of a substrate having a hexagonal $B_8$ structure.

25. A soft magnetic thin film as defined in claim 24 wherein the film has been formed on a c-plane of a NiMnGe substrate.

* * * * *